United States Patent
Park et al.

(10) Patent No.: US 9,268,006 B2
(45) Date of Patent: Feb. 23, 2016

(54) METHOD AND APPARATUS FOR PROVIDING INFORMATION BASED ON A LOCATION

(75) Inventors: Kyong-ha Park, Gyeonggi-do (KR); Hyun-su Hong, Gyeonggi-do (KR); Sergey Zhidkov, Izhevsk (RU); Vladimir Chebaev, Ol'khovka (RU)

(73) Assignee: Samsung Electronics Co., Ltd (KR)

( * ) Notice: Subject to any disclaimer, the term of this patent is extended or adjusted under 35 U.S.C. 154(b) by 74 days.

(21) Appl. No.: 13/603,960

(22) Filed: Sep. 5, 2012

(65) Prior Publication Data

US 2013/0065611 A1 Mar. 14, 2013

(30) Foreign Application Priority Data

Sep. 14, 2011 (KR) ........................ 10-2011-0092564

(51) Int. Cl.
| | |
|---|---|
| H04M 11/04 | (2006.01) |
| H04M 3/493 | (2006.01) |
| H04W 24/00 | (2009.01) |
| G01S 5/00 | (2006.01) |
| G01S 5/18 | (2006.01) |

(52) U.S. Cl.
CPC *G01S 5/0036* (2013.01); *G01S 5/18* (2013.01)

(58) Field of Classification Search
CPC ........... H04W 4/02–4/08; H04W 4/18; H04W 4/185; H04W 4/206; H04W 8/18; H04W 8/183; H04W 8/186; H04W 64/00; H04W 64/003; H04W 64/006
USPC .............. 455/404.2, 414.2, 440, 456.1, 456.3
See application file for complete search history.

(56) References Cited

U.S. PATENT DOCUMENTS

| 6,999,726 B2 | 2/2006 | Rosenfeld |
| 2002/0198004 A1* | 12/2002 | Heie et al. ..................... 455/456 |
| 2007/0264968 A1* | 11/2007 | Frank et al. ................ 455/404.2 |
| 2010/0149031 A1 | 6/2010 | Dawson et al. |
| 2010/0210259 A1* | 8/2010 | Morales Barbosa ............ H04M 3/42357 455/422.1 |
| 2011/0028160 A1 | 2/2011 | Roeding et al. |

(Continued)

FOREIGN PATENT DOCUMENTS

| EP | 1 758 308 | 2/2007 |
| JP | 2009043057 | 2/2009 |

(Continued)

OTHER PUBLICATIONS

Martin Azizyan et al., "SurroundSense: Mobile Phone Localization via Ambience Fingerprinting", MobiCom '09: Proceedings of the 15th Annual International.

(Continued)

*Primary Examiner* — San Htun
(74) *Attorney, Agent, or Firm* — The Farrell Law Firm, P.C.

(57) ABSTRACT

A method and apparatus for providing location information are provided. The method includes receiving data including reference sound information from at least one external device; receiving location information request data including sound information from the mobile device; detecting similar reference sound information to the sound information based on a comparison of the sound information to the reference sound information; determining location in formation of an external device that transmitted the similar reference sound information; and transmitting the determined location information to the mobile device.

19 Claims, 17 Drawing Sheets

(56) References Cited

U.S. PATENT DOCUMENTS

| | | | |
|---|---|---|---|
| 2012/0083286 A1* | 4/2012 | Kim et al. | 455/456.1 |
| 2012/0142378 A1* | 6/2012 | Kim et al. | 455/456.6 |
| 2012/0224711 A1* | 9/2012 | Kim et al. | 381/77 |

FOREIGN PATENT DOCUMENTS

| | | |
|---|---|---|
| KR | 1020040031020 | 4/2004 |
| KR | 1020070034476 | 3/2007 |
| KR | 1020080020099 | 3/2008 |
| KR | 1020100094264 | 8/2010 |
| WO | WO 02/082832 | 10/2002 |
| WO | WO 2011/059224 | 5/2011 |
| WO | WO 2012/048027 | 4/2012 |

OTHER PUBLICATIONS

Conference on Mobile Computing and Networking, Sep. 20-25, 2009.

Nissanka Priyantha et al., "The Cricket Location-Support System", MobiCom '00: Proceedings of the 6th Annual International Conference on Mobile Computing and Networking, 2000.

European Search Report dated Mar. 31, 2015 issued in counterpart application No. 12831130.5-1812.

Australian Examination Report dated Feb. 13, 2015 issued in counterpart application No. 2012309303.

* cited by examiner

YOU ARE NEARBY B, C, E, F SHOPS ON
1st FLOOR OF A DEPARTMENT STORE.

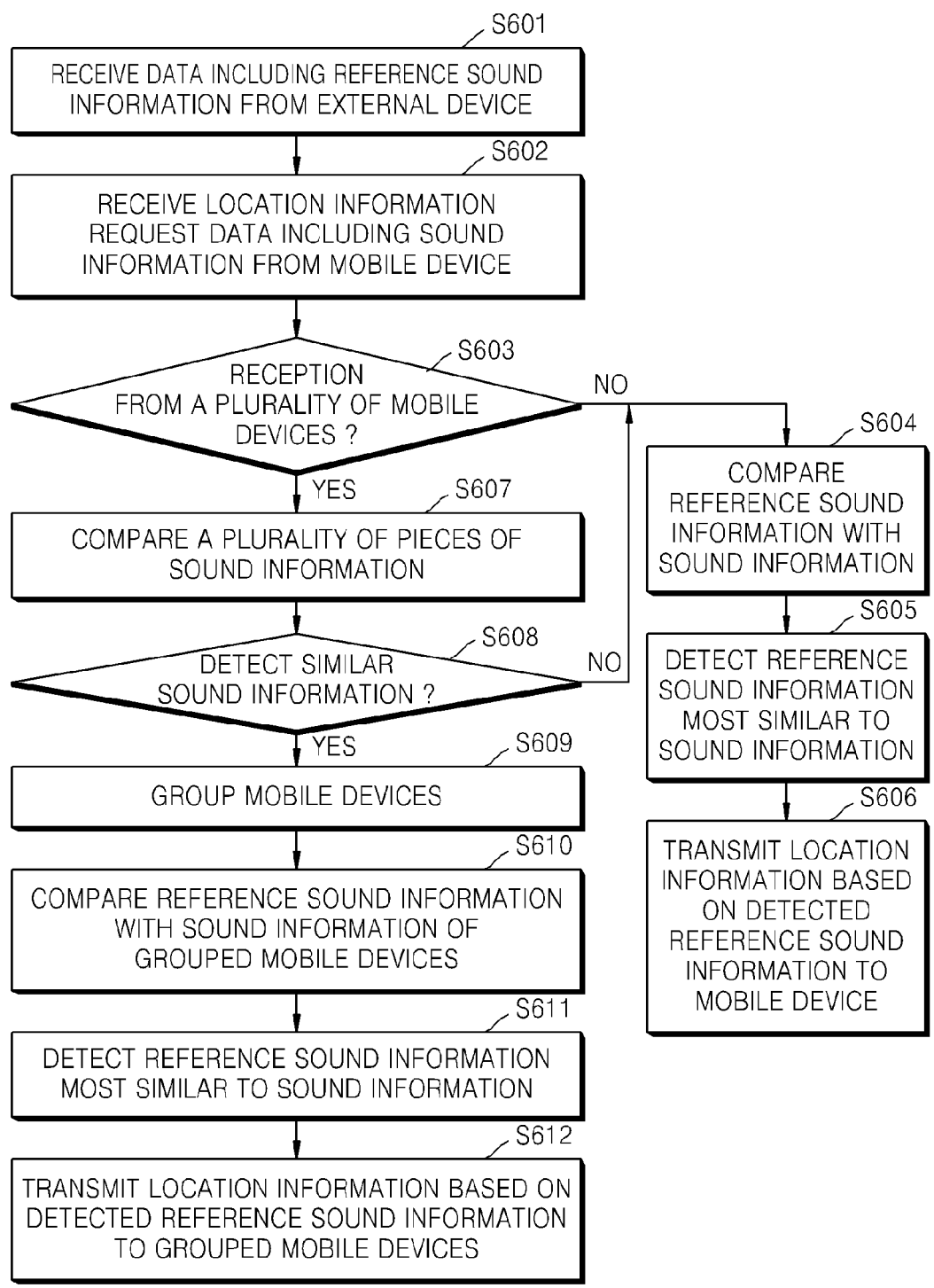

METHOD AND APPARATUS FOR PROVIDING INFORMATION BASED ON A LOCATION

PRIORITY

This application claims priority under 35 U.S.C. §119(a) to Korean Patent Application No. 10-2011-0092564, which was filed in the Korean Intellectual Property Office on Sep. 14, 2011, the entire disclosure of which is hereby incorporated by reference.

BACKGROUND OF THE INVENTION

1. Field of the Invention

The present invention relates to a method and apparatus for providing information, and more particularly, to a method and apparatus for providing information according to location tracking or positioning of a device.

2. Description of the Related Art

As network environments have become increasingly ubiquitous, various technologies have been proposed to provide information according to location tracking or positioning of a device.

A device, e.g., a mobile device, performs location tracking or positioning based on a Global Positioning System (GPS) or Wireless Fidelity (Wi-Fi), wherein the device consumes a large amount of current while location tracking or positioning. Further, location tracking or positioning is performed using GPS is often unavailable in an indoor environment.

SUMMARY OF THE INVENTION

Accordingly, the present invention is designed to address at least the problems and/or disadvantages described above and to provide at least the advantages described below.

An aspect of the present invention is to provide a method and apparatus for providing location information of a device by using sounds surrounding the device.

Another aspect of the present invention is to provide a method and apparatus for providing information based on a location of a device that is tracked by using sounds surrounding the device.

Another aspect of the present invention is to provide a method and apparatus for providing location information with respect to devices that are grouped by using sounds surrounding the devices.

Another aspect of the present invention is to provide a method and apparatus for providing information based on a location of devices that are grouped and then tracked by using sounds surrounding the devices.

Another aspect of the present invention is to provide a device capable of outputting location information and/or information related to the location information, obtained using surrounding sounds.

Another aspect of the present invention is to provide a method and apparatus for providing location information with respect to a device by using a surrounding circumstance of the device.

Another aspect of the present invention is to provide a method and apparatus for providing information based on a location of a device, which is tracked using a surrounding circumstance of the device.

In accordance with an aspect of the present invention, a method for providing location information to a mobile device is provided. The method includes receiving data including reference sound information from at least one external device; receiving location information request data including sound information from the mobile device; detecting similar reference sound information to the sound information based on a comparison of the sound information to the reference sound information; determining location in formation of an external device that transmitted the similar reference sound information; and transmitting the determined location information to the mobile device.

In accordance with another aspect of the present invention, a method of providing location information to a mobile device is provided. The method includes receiving data including reference sound information from at least one external device; receiving location information including sound information from a plurality of mobile devices; comparing the sound information received from the plurality of mobile devices; grouping mobile devices that have transmitted similar sound information, according to a result of the comparing the sound information; detecting similar reference sound information based on a comparison of the reference sound information to the similar sound information grouped mobile devices; determining location in formation of an external device that transmitted the similar reference sound information; and transmitting the determined location information to each of the grouped mobile devices.

In accordance with another aspect of the present invention, an apparatus for providing location information to a mobile device is provided. The apparatus includes a communication unit for receiving data including reference sound information from at least one external device, receiving location information request data including sound information from the mobile device; and a processor for detecting similar reference sound information to the sound information based on a comparison of the sound information to the reference sound information, and determining location information of an external device that transmitted the similar reference sound information. The communication unit transmits the determined location information to the mobile device.

In accordance with another aspect of the present invention, an apparatus for providing location information to a mobile device is provided. The apparatus includes a communication unit for receiving data including reference sound information from at least one external device, and receiving location information including sound information from a plurality of mobile devices; and a processor for comparing the sound information received from the plurality of mobile devices, grouping mobile devices that have transmitted similar sound information, according to a result of the comparing the sound information, detecting similar reference sound information based on a comparison of the reference sound information to the similar sound information grouped mobile devices, and determining location in formation of an external device that transmitted the similar reference sound information. The communication unit transmits the determined location information to each of the grouped mobile devices.

BRIEF DESCRIPTION OF THE DRAWINGS

The above and other aspects, features, and advantages of the present invention will become more apparent from the following detail description with reference to the attached drawings, in which:

FIG. 6 is a flowchart illustrating a method of providing information, according to an embodiment of the present invention;

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
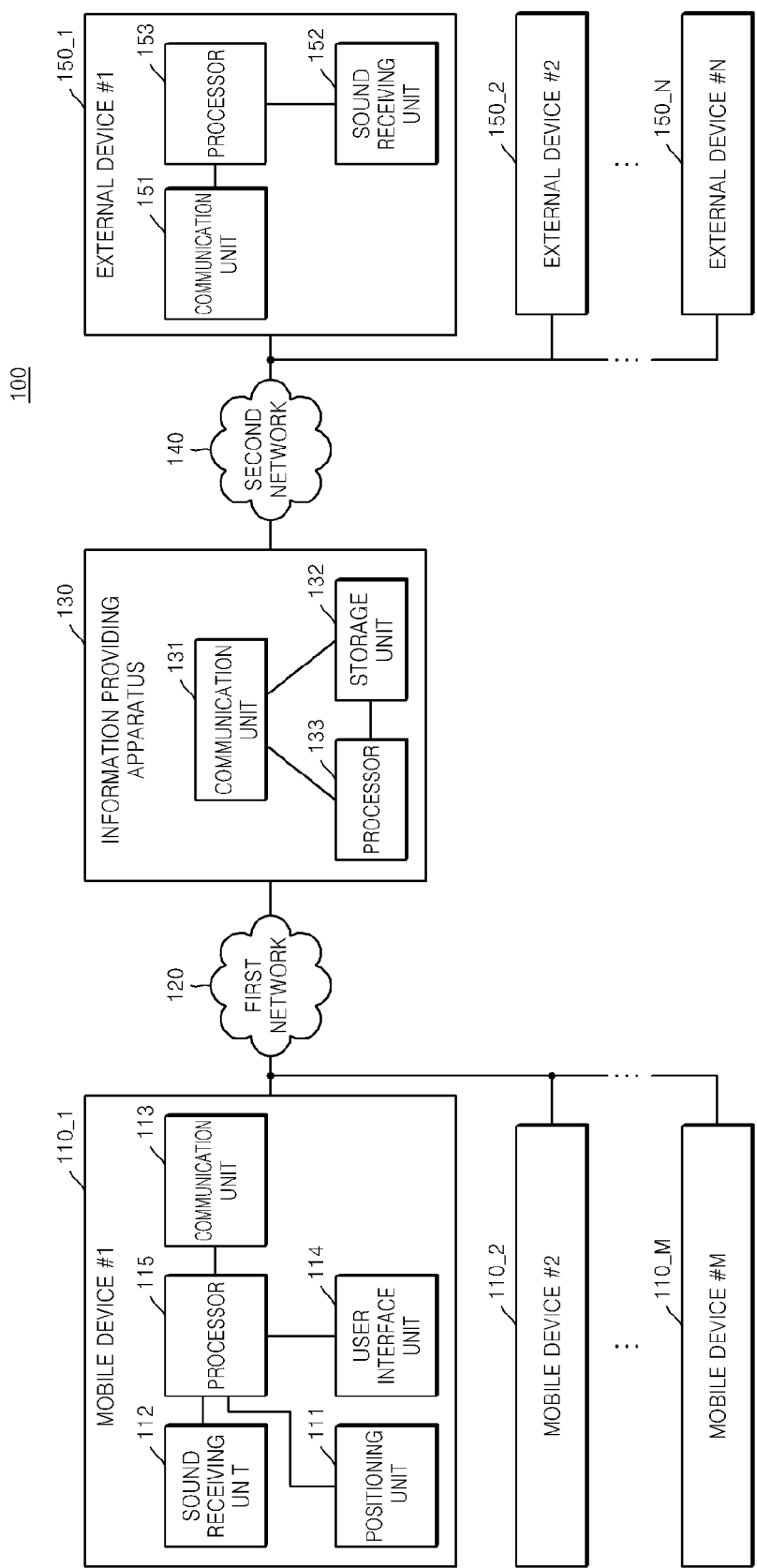
FIG. 1 is a block diagram illustrating a service providing system including an information providing apparatus according to an embodiment of the present invention.

FIG. 1 is a block diagram illustrating a service providing system including an information providing apparatus according to an embodiment of the present invention.

Referring to FIG. 1, the service providing system 100 includes M mobile devices #1 110_1 through #M 110_M, a first network 120, the information providing apparatus 130, a second network 140, and N external devices #1 150_1 through #N 150_N.

As illustrated in the mobile device #1 110_1 of FIG. 1, each of the M mobile devices #1 110_1 through #M 110_M includes a positioning unit 111, a sound receiving unit 112, a communication unit 113, a user interface unit 114, and a processor 115. The positioning unit 111 determines a location of the mobile device #1 110_1, e.g., based on a triangulation technique including an Angle of Arrival (AoA), a Time of Arrival (ToA), a Time Difference of Arrival (TDoA), etc., a cell IDentification (ID) positioning technique, an enhanced cell ID positioning technique, a finger print technique, a Global Positioning System (GPS), an Assisted GPS (AGPS), a Differential GPS (DGPS), Wireless Fidelity (Wi-Fi), infrared light, ultrasonic waves, Radio Frequency ID (RF-ID), Bluetooth, a dead reckoning technique using a gravity sensor (e.g., a geomagnetic sensor, an acceleration sensor, a gyroscope, and an altimeter), etc. Further, the positioning unit 111 may include a plurality of units based on a plurality of location determination techniques in order to selectively use different location determination techniques.

The sound receiving unit 112, e.g., a microphone, receives sounds around the mobile device #1 110_1.

The communication unit 113 exchanges data and/or information with the information providing apparatus 130 via the first network 120, e.g., in the form of a signal. The communication unit 113 may be formed according to a communication protocol of the first network 120. For example, for mobile communication, the communication unit 113 exchanges data based on Code Division Multiple Access (CDMA), Global System for Mobile communication (GSM), Time Division Multiple Access (TDMA), or Personal Communication System (PCS), and for local area wireless communication, the communication unit 113 exchanges data based on Wi-Fi, Bluetooth, or RF-ID.

The user interface unit 114 outputs and receives data or information to and from a user. For example, the user interface unit 114 may output data or information that can be viewed, listened to or viewed and listened to by a user of the mobile device #1 110_1. Further, the user interface unit 114 may be divided into an input unit (not shown) and an output unit (not shown).

According to an embodiment of the present embodiment, the user interface unit 114 receives a location information request command. Further, location information map information, and additional information related to the location information of the mobile device #1 110_1 may be input via the user interface unit 114. The location information may also be referred to as positioning information.

The processor 115 generates location information request data including sound information based on the surrounding sound received via the sound receiving unit 112, and transmits the location information request data to the information providing apparatus 130 via the communication unit 113. When the location information, the map information, and/or the additional information related to the location information are received via the communication unit 113, the processor 115 outputs the received information via the user interface unit 114. The location information, the map information, and/or the additional information related to the location information received via the communication unit 113 may be referred to as "response data" in response to the location information request data. The location information request data and the response data may also be referred to as a "location information request message" and a "response message", respectively.

When the user inputs a location information request command via the user interface unit 114, the processor 115 may perform an operation based on the received surrounding sound. That is, when the user inputs the location information request command via the user interface unit 114, the processor 115 drives the sound receiving unit 112 and then receives the sound surrounding the mobile device #1 110_1. The processor 115 drives the sound receiving unit 112 and then receives the surrounding sound for a predetermined period or at a predetermined time.

The processor 115 generates the location information request data including sound information based on the received surrounding sound, and transmits the location information request data to the information providing apparatus 130 via the communication unit 113. The processor 115 then outputs the response data to the user interface unit 114.

The first network 120 may be configured as a network enabled for wireless data communication such as Wi-Fi, 3$^{rd}$ Generation (3G), 4$^{rd}$ Generation (4G), Wideband Code Division Multiple Access (WCDMA), RF-ID, Bluetooth, etc.

The information providing apparatus 130 provides location-based information of a mobile device that transmits location information request data from among the mobile devices #1 110_1 through #M 110_M connected via the first network 120. The information providing apparatus 130 may be a server that provides location information regarding the mobile devices #1 110_1 through #M 110_M or that provides location information and additional information or additional data related to the location information regarding the mobile devices #1 110_1 through #M 110_M.

The information providing apparatus 130 may manage a specific space. For example, the information providing apparatus 130 may manage all communication-enabled devices located in a department store, by receiving location information request data from a mobile device of a customer who visits the department store, and providing the customer with information based on the location of the mobile device.

The information providing apparatus 130 includes a communication unit 131, a storage unit 132, and a processor 133. The communication unit 131 may communicate via the first network 120, e.g., exchange data or information with the at least one the of mobile devices #1 110_1 through #M 110_M, and may communicate via the second network 140, e.g., exchange data or information with the at least one of the external devices #1 150_1 through #N 150_N.

The storage unit 132 stores programming and data for executing one or more embodiments of the present invention. For example, the data stored in the storage unit 132 may include reference sound information received from at least one of the external devices #1 150_1 through #N 150_N.

As indicated by reference numeral 360 of FIG. 3, which is described in more detail below, the storage unit 132 may store the reference sound information in a database based on an ID information field of an external device, a time information field, and a reference sound information field. The time information field includes a start time and an end time with respect to reception of the reference sound information.

The data stored in the storage unit 132 may include location information of the mobile devices #1 110_1 through #M 110_M, which is determined by the positioning unit 111 included in each of the mobile devices #1 110_1 through #M 110_M, and information for determining a predetermined area. The predetermined area is determined based on the location information determined by the positioning unit 111 to provide the location-based information regarding one of the mobile devices #1 110_1 through #M 110_M.

The information for determining the predetermined area may include cell information and a predetermined distance based on the location information of the mobile devices #1 110_1 through #M 110_M which is determined by the positioning unit 111. The predetermined distance indicates a distance from the mobile devices #1 110_1 through #M 110_M having the location information determined by the positioning unit 111.

For example, if the predetermined distance is 3 M, an area within 3 M with respect to the location information of the mobile devices #1 110_1 through #M 110_M, which is determined by the positioning unit 111, may be determined as the predetermined area.

The location information determined by the positioning unit 111, and the location information provided according to one or more embodiments of the present invention are all related to the mobile devices #1 110_1 through #M 110_M, but are different from each other. That is, the location information determined by the positioning unit 111 is unrelated to the information providing apparatus 130 and may include location information regarding the mobile devices #1 110_1 through #M 110_M in an outdoor environment.

The location information provided according to one or more embodiments of the present invention is provided by the information providing apparatus 130 and may include location information regarding the mobile devices #1 110_1 through #M 110_M in an indoor environment.

The data stored in the storage unit 132 may include map information. Therefore, when at least one of the external devices #1 150_1 through #N 150_N is connected to the information providing apparatus 130, the data stored in the storage unit 132 may include information for managing the connected external device.

As indicated by reference numeral 350 of FIG. 3, which is described in more detail below, the information for managing the connected external device may include ID information and current location information about the connected external device.

A program stored in the storage unit 132 may be loaded to the processor 133.

Thereafter, the processor 133 may perform a method according to an embodiment of the present invention by executing the program stored in the storage unit 132.

The processor 133 stores the data including the reference sound information received from at least one of the external devices #1 150_1 through #N 150_N via the communication unit 131. The data including the reference sound information may be received when at least one of the mobile devices #1 110_1 through #M 110_M enters an area managed by the information providing apparatus 130, or when at least one of the mobile devices #1 110_1 through #M 110_M requests location information. Whether a mobile device enters the area managed by the information providing apparatus 130 may be determined based on the location information of the mobile devices #1 110_1 through #M 110_M, which is determined by each positioning unit 111 included in the mobile devices #1 110_1 through #M 110_M.

When location information request data including sound information is received from at least one of the mobile devices #1 110_1 through #M 110_M via the communication unit 131, the processor 133 detects reference sound information from the reference sound information stored in the storage unit 132, which is most similar to the received sound information. The processor 133 transmits location information to a corresponding mobile device via the communication unit 131 based on location information of one of the external devices #1 150_1 through #N 150_N that transmits the detected reference sound information. The corresponding mobile device indicates the at least one mobile device that has transmitted the location information request data.

The second network 140 may be formed as a wired network, a wireless network, or a Local Area Network (LAN). When the second network 140 is a wireless network, the second network 140 may be formed in the same manner as the first network 120. When the second network 140 is a wired network, the second network 140 uses a wired protocol such as wired Internet.

When the second network 140 is a LAN, the second network 140 may utilize a wireless protocol such as Zigbee, Wi-Fi, Bluetooth, Institute of Electrical and Electronics Engineers (IEEE) 802.11, Home RF, Infrared Data Association (IrDA), Ultra WideBand (UWB), and wireless 1394, or a wired protocol such as Ethernet, Phoneline Networking Alliance (HomePNA), Power Line Communications (PLC), IEEE 1394, and Universal Serial Bus (USB).

The external devices #1 150_1 through #N 150_N are connected to the second network 140. For example, the external devices #1 150_1 through #N 150_N may include a wireless terminal, a wired terminal, or a wired-wireless terminal such as a notebook.

The external devices #1 150_1 through #N 150_N may be fixedly located in a specific place and may provide information about their respective current locations to the information providing apparatus 130 as additional information. The information related to a current location of the external devices #1 150_1 through #N 150_N includes reference sound information, event information, coupon information, a homepage, a blog, etc.

Figure 9:
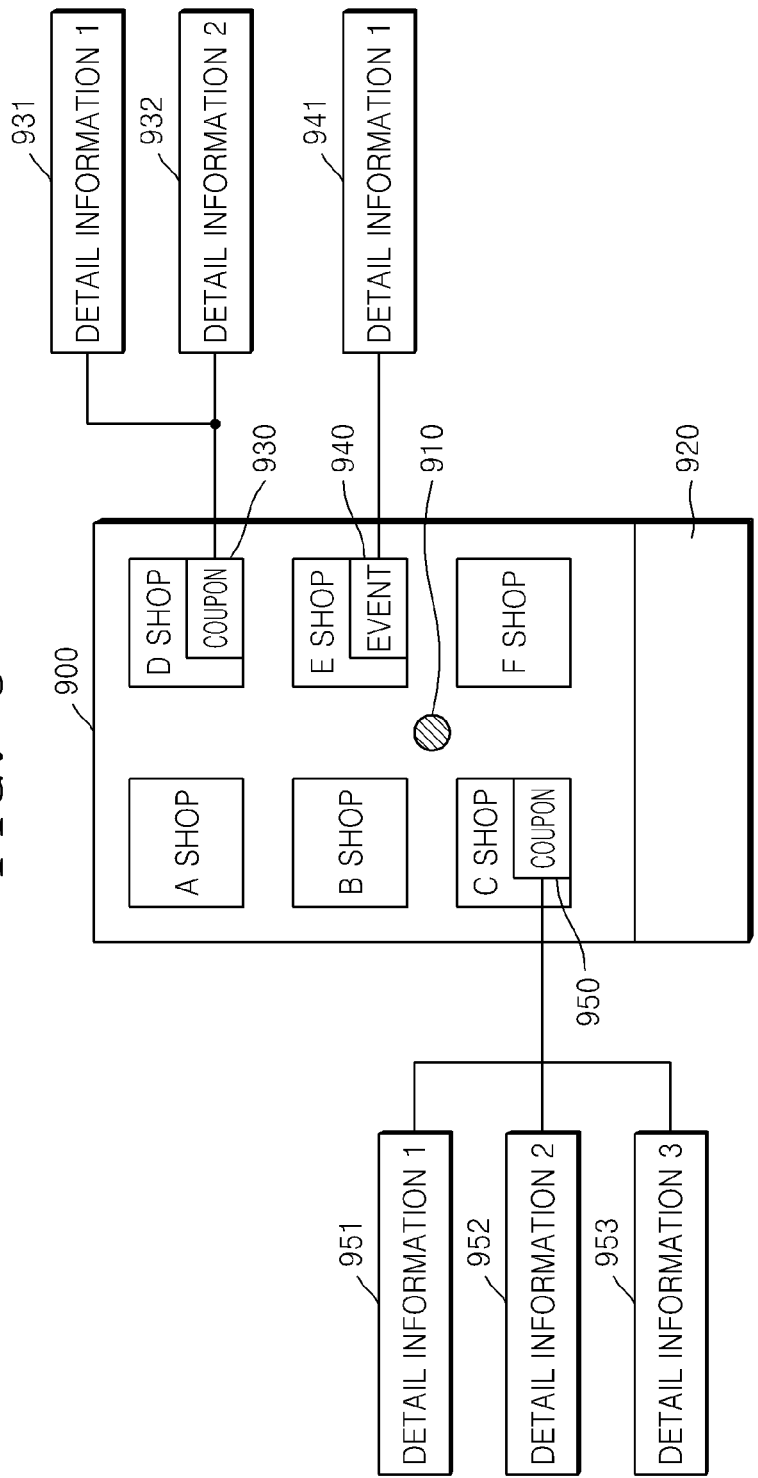
FIG. 9 illustrates an example of location information regarding a mobile device according to an embodiment of the present invention.

When the external devices #1 150_1 through #N 150_N transmit event information, coupon information, etc., to the information providing apparatus 130, the processor 133 generates menu information with respect to the received information and then provides the menu information to the corresponding mobile device. For example, where there is detail information for the event information and the coupon information, the processor 133 generates the menu information in which the event information and the coupon information are set as upper layer menu items, and the detail information for each of the event information and the coupon information is set as a lower layer item. The menu information may then be output to the corresponding mobile device as illustrated in FIG. 9.

As illustrated in the external device #1 150_1 of FIG. 1, each of the external devices #1 150_1 through #N 150_N includes the communication unit 151, a sound receiving unit 152, and a processor 153.

The communication unit 151 connects with the information providing apparatus 130 via the second network 140 and transmits or receives data or information. The communication unit 151 may be formed according to communication protocol of the second network 140. For example, if the second network 140 is a LAN, the communication unit 151 transmits or receives data or information according to the LAN.

Like the sound receiving unit 112, the sound receiving unit 152 receives sound surrounding the external devices #1 150_1 through #N 150_N.

Regardless of a request from the information providing apparatus 130, the processor 153 may provide reference sound information based on the surrounding sound received by the sound receiving unit 152 to the information providing apparatus 130 via the communication unit 151. In order to distinguish sound information based on the surrounding sound received by the sound receiving unit 152 from the sound information based on the surrounding sound with respect to the mobile devices #1 110_1 through #M 110_M, the sound information from the sound receiving unit 152 is referred to as the reference sound information.

Like the processor 115, the processor 153 controls the sound receiving unit 152 to receive surrounding sound for a predetermined period or at a predetermined time. Information regarding the predetermined period or the predetermined time is set as a period or a time to determine similarity or relativity by comparing the sound information received by the sound receiving unit 112 with the sound information received by the sound receiving unit 152.

The processor 153 may transmit data including the reference sound information received by the sound receiving unit 152 to the information providing apparatus 130, in response to a request from the information providing apparatus 130. The information providing apparatus 130 may automatically update information regarding the external devices #1 150_1 through #N 150_N that is stored in the storage unit 132 whenever at least one of the external devices #1 150_1 through #N 150_N is connected. The information regarding the external devices #1 150_1 through #N 150_N that is stored in the storage unit 132 may be referred to as database information including ID information and location information regarding the external devices #1 150_1 through #N 150_N, as indicated by reference numeral 350 in FIG. 3.

Figure 3:
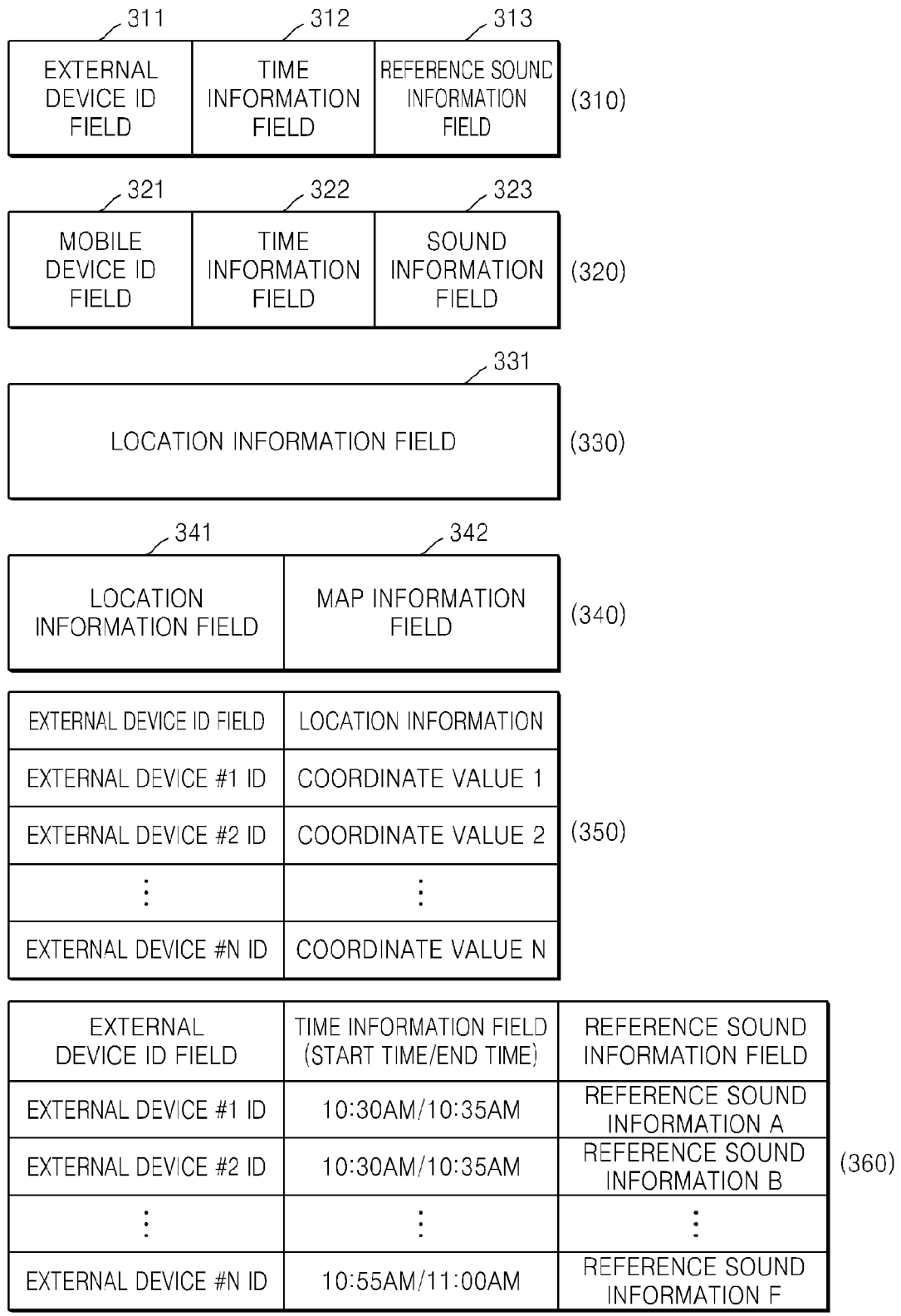
FIG. 3 illustrates examples of data structures transmitted when information is provided, and examples of external device information structures stored in a storage unit, according to embodiments of the present invention.

When at least one external device is connected to the information providing apparatus 130, the information providing apparatus 130 may manage the connected external device by receiving ID information and location information regarding the connected external device, as indicated by reference numeral 350 of FIG. 3, and by automatically storing the ID information and the location information in the storage unit 132 included in the information providing apparatus 130.

Figure 2:
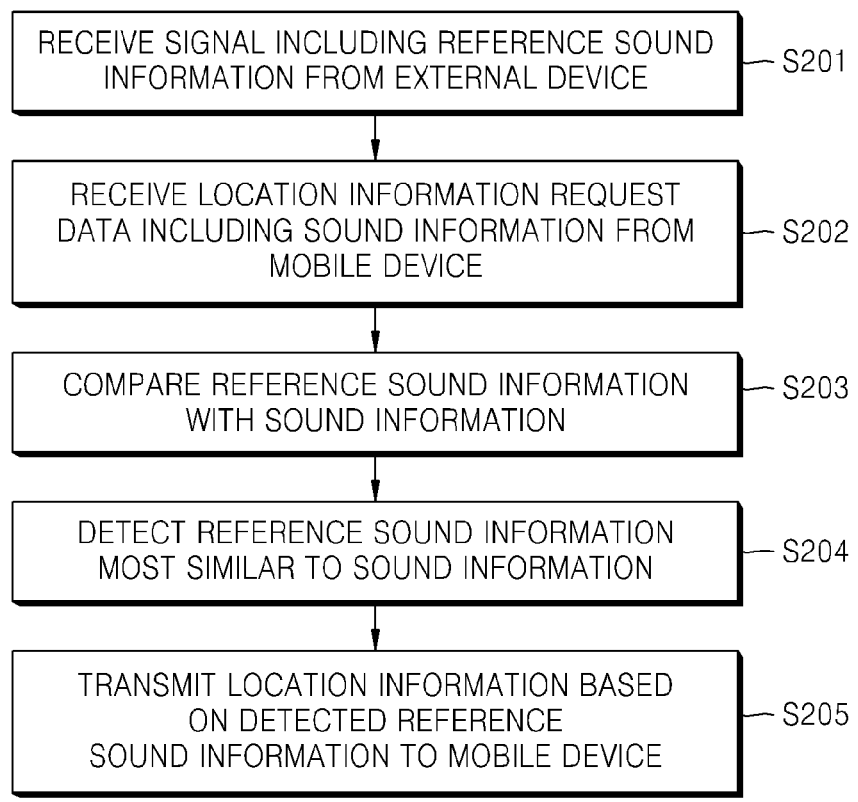
FIG. 2 is a flowchart illustrating a method of providing information, according to an embodiment of the present invention.

FIG. 2 is a flowchart illustrating a method of providing information, according to an embodiment of the present invention. Specifically, the flowchart of FIG. 2 corresponds to an operation wherein location information of a mobile device is provided by receiving data including reference sound information from external devices #1 150_1 through #N 150_N.

Referring to FIG. 2, in step S201, the processor 133 receives the data including the reference sound information from all connectable external devices #1 150_1 through #N 150_N. Although FIG. 1 illustrates N external devices #1 150_1 through #N 150_N, it assumed herein that only one external device may be connected to the processor 133. Thus, the data including the reference sound information received by the processor 133 in step S201 is received from the one external device.

FIG. 3 illustrates examples of data structures transmitted when information is provided, and examples of external device information structures, according to embodiments of the present invention.

Referring to FIG. 3, the data including the reference sound information received from the external devices #1 150_1 through #N 150_N 310 includes an external device ID information field 311, a time information field 312, and a reference sound information field 313. The time information field 312 includes start time information and end time information for receiving the reference sound information.

In step S202, the processor 133 receives location information request data including sound information from at least one of the mobile devices #1 110_1 through #M 110_M connected via the first network 120. As described above, the location information request data may be generated in response to a location information request command by a user of each of the mobile devices #1 110_1 through #M 110_M. Alternatively, a program loaded into the processor 133 may be changed to take into account that the location information request data is received when sound information is received from the mobile device #1 110_1.

A structure of the location information request data received from the mobile devices #1 110_1 through #M 110_M may be formed as indicated by reference numeral 320 of FIG. 3. Referring to FIG. 3, the location information request data received from each of the mobile devices #1 110_1 through #M 110_M 320 includes a mobile device ID information field 321, a time information field 322, and a reference sound information field 323 of each of the mobile devices #1 110_1 through #M 110_M. The time information field 322 includes start time information and end time information for receiving the sound information.

For convenience of description, FIG. 2 will be described with reference to a scenario in which the location information request data is received from the mobile device #1 110_1.

In step S203, the processor 133 compares the sound information with the reference sound information. Specifically, the processor 133 detects data stored in the storage unit 132 and received from among the mobile devices #1 110_1 through #M 110_M, and that has time information synchronized with time information included in the time information field 322 of the location information request data received from the mobile device #1 110_1. That is, the processor 133 detects the reference sound information having start time information and end time information that are the same as start time information and end time information included in the time information field 322 of the location information request data.

If data received from the external device #1 150_1 and the external device #2 150_2 matches with the time information included in the location information request data received from the mobile device #1 110_1, the processor 133 compares reference sound information stored in the reference sound information field 313 included in the detected data with sound information stored in the reference sound information field 323 of the location information request data received from the mobile device #1 110_1. The comparison between the reference sound information and the sound information may be performed by obtaining a correlation between two sounds or by a acquiring feature points of two sounds and then comparing the feature points. A cross-correlation analyzing method may be used to correlate the two sounds.

To acquire feature points of two sounds, clustering according to a vector quantization technique may be performed using audio feature values (e.g., Mel-Frequency Cepstral Coefficients/Linear Predictive Cepstral Coefficients (MFCC/LPCC), Spectral Flatness Measure/Spectral Crest Factor (SFM/SCF), or pitch), for generating probability distribution based on a histogram of the characteristic values, and then using the generated probability distribution as a feature point.

In step S204, reference sound information that is the most similar to the sound information is detected according to a result of the comparison between the reference sound information and the sound information in step S203. When a correlation between two sounds is used in step S203, the most similar reference sound information is reference sound information that has the most similar feature point to a feature point acquired from the sound information received from the mobile device #1 110_1.

When the most similar reference sound information is detected in step S204, the processor 133 refers to an external device ID field included in data having the detected reference sound information, and thus identifies an external device that has transmitted the detected reference sound information. If the identified external device is external device #1 150_1, the processor 133 detects location information regarding the external device #1 150_1 from among management information for the external devices #1 150_1 through #N 150_N, which is stored in the storage unit 132, as indicated by reference numeral 350 of FIG. 3.

If the management information for the external devices #1 150_1 has a structure as indicated by reference numeral 350 of FIG. 3, the processor 133 detects location information (a coordinate value 1) by using the ID information of the external device #1 150_1. The coordinate value 1 includes latitude, longitude, and altitude of a corresponding location.

When the location information is detected, the processor 133 transmits location information based on the detected location information for the external device #1 150_1 to the mobile device #1 110_1 via the communication unit 131 and the first network 120. The location information transmitted to the mobile device #1 110_1 may have the same location information as location information of the external device #1 150_1, but may have a text form based on the location information of the external device #1 150_1.

When only the location information is transmitted, the location information that is transmitted from the processor 133 to the mobile device #1 110_1 may include a location information field as indicated by reference numeral 330 of FIG. 3. However, if map information, which is based on the location information and is stored in the storage unit 132, is transmitted with the location information, as indicated by reference numeral 340 of FIG. 3, the processor 133 may generate location information including a location information field 341 and a map information field 342, and may transmit the location information to the mobile device #1 110_1.

As described above, in order to track a location of the mobile device, location information for a mobile device may be performed using surrounding sound without using a GPS function module or a Wi-Fi function module, so that power consumption by the mobile device may be decreased. Also, because the location of the mobile device is tracked according to whether surrounding sound around an external device matches with surrounding sound around the mobile device, the location of the mobile device may be accurately tracked.

Figure 4:
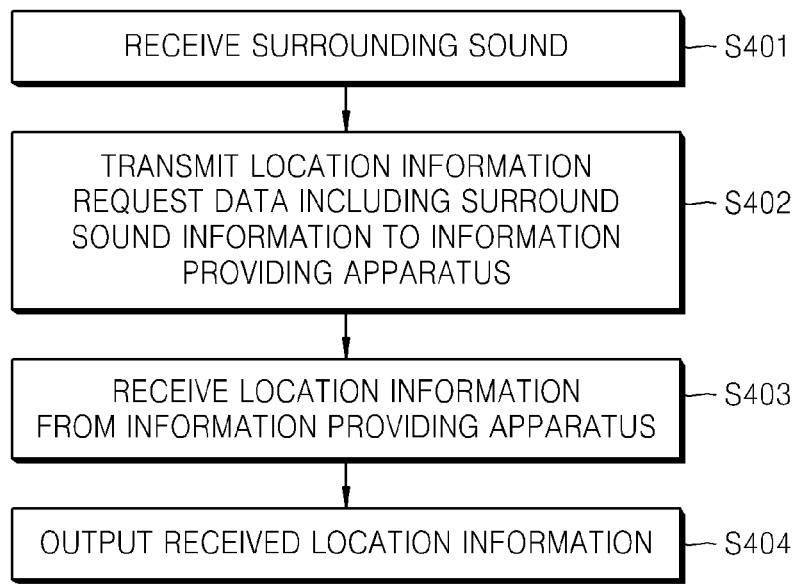
FIG. 4 is a flowchart illustrating a method of providing information by a mobile device, according to an embodiment of the present invention.

FIG. 4 is a flowchart illustrating a method of providing information, according to an embodiment of the present invention.

Referring to FIG. 4, in step S401, the processor 115 controls the sound receiving unit 112, thereby receiving surrounding sound around the mobile device #1 110_1. As described above with reference to FIG. 1, the processor 115 receives the surrounding sound for a predetermined period or at a predetermined time. When the surrounding sound is received, in step S402, the processor 115 transmits location information request data including sound information based on the received surrounding sound to the information providing apparatus 130 via the first network 120.

In response to the transmission, when location information is received from the information providing apparatus 130 in step S403, the processor 115 outputs the received location information via the user interface unit 114 in step S404. The received location information has a data structure as indicated by reference numeral 330 of FIG. 3.

Figures 5A, 5B:
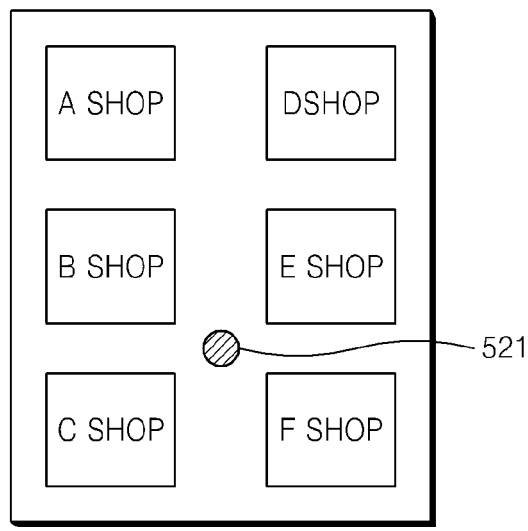
FIGS. 5A and 5B illustrate examples of location information regarding mobile devices, according to embodiments of the present invention.

FIGS. 5A and 5B illustrate examples of location information regarding the mobile devices #1 110_1 through #M 110_M, which are output to the mobile devices #1 110_1 through #M 110_M. Specifically, when location information included in a location information field 331 has a text form, the location information output via the user interface unit 114 may be in a text form as illustrated in FIG. 5A. Further, when the received location information includes map information as indicated by the reference numeral 340 of FIG. 3, the location information output via the user interface unit 114 may be as illustrated in FIG. 5B.

Referring to FIG. 5B, reference numeral 521 indicates a current location of the mobile device #1 110_1

FIG. 6 is a flowchart illustrating a method of providing information, according to an embodiment of the present invention. Specifically, FIG. 6 illustrates a process where location information request data is received from a plurality of mobile devices. Further, steps S601 through S606 of FIG. 6, when location information is only received from one mobile device, are the same as steps S201 through S205 of FIG. 2, which have already been described above. Accordingly, a repetitive detailed description of steps S601 through S606 is omitted.

Referring to FIG. 6, in step S603, the processor 133 of the information providing apparatus 130 determines that the received location information request data is from the plurality of mobile devices. For example, the processor 133 may check ID information for a mobile device included in the location information request data to determine whether the location information request data is received from the plurality of mobile devices.

In step S607 the processor 133 compares sound information included in the location information request data received from the plurality of mobile devices. For example, the processor 133 may first check time information fields included in the sound information to determine whether the sound information is detected at the same time. If the sound information is detected at the same time, the processor 133 compares the sound information detected at the same time to detect similar sound information. For example, the detection of the similar sound information may be performed by measuring a correlation between the sound information, or by measuring similarities by acquiring feature points of the sound information, as described in steps S203 of FIG. 2.

If no sound information is detected at the same time, or if there is no similar sound information, although they are detected at the same time, the method proceeds to step S604 and then provides location information by processing sound information received from each of the mobile devices in the manner described with reference to FIG. 2. That is, the processor 133 detects reference sound information that is most similar to the sound information received from each of the plurality of mobile devices, and thus provides location information regarding each of the plurality of mobile devices.

However, when similar sound information exists, in step S609, the processor 133 groups mobile devices that have transmitted location information request data including the similar sound information. Here, it is assumed that the mobile device #1 110_1 and the mobile device #2 110_2 have transmitted location information request data including similar sound information. Therefore, the processor 133 groups the mobile device #1 110_1 and the mobile device #2 110_2.

Thereafter, the sound information included in two pieces of location information request data from the mobile device #1 110_1 and the mobile device #2 110_2 are determined as one sound information. If the two pieces of sound information are the same, there is no difficulty in determining one sound information. However, if the two pieces of sound information are similar, but not quite the same, sound information included in one of the two pieces of location information request data of the mobile device #1 110_1 and the mobile device #2 110_2 may be randomly selected as sound information for the grouped mobile devices #1 110_1 and #2 110_2. However, sound information having small noise information from among the two pieces of sound information may be determined as the sound information of the grouped mobile devices #1 110_1 and #2 110_2.

Alternatively, sound information formed of feature points acquired from the two pieces of sound information may be determined as sound information of the grouped mobile devices #1 110_1 and #2 110_2.

When sound information of the grouped mobile devices #1 110_1 and #2 110_2 is determined, in step S610, the processor 133 compares the sound information of the grouped mobile devices #1 110_1 and #2 110_2 with reference sound information stored in the storage unit 132 to detect reference sound information that is the most similar to the sound information of the grouped mobile devices #1 110_1 and #2 110_2 in step S611. The sound information comparison, and the detection of the reference sound information that is the most similar to the sound information may be performed as described in steps S203 and S204 of FIG. 2.

In step S612, the processor 133 transmits location information based on the detected reference sound information to each of the grouped mobile devices #1 110_1 and #2 110_2.

Figure 7:
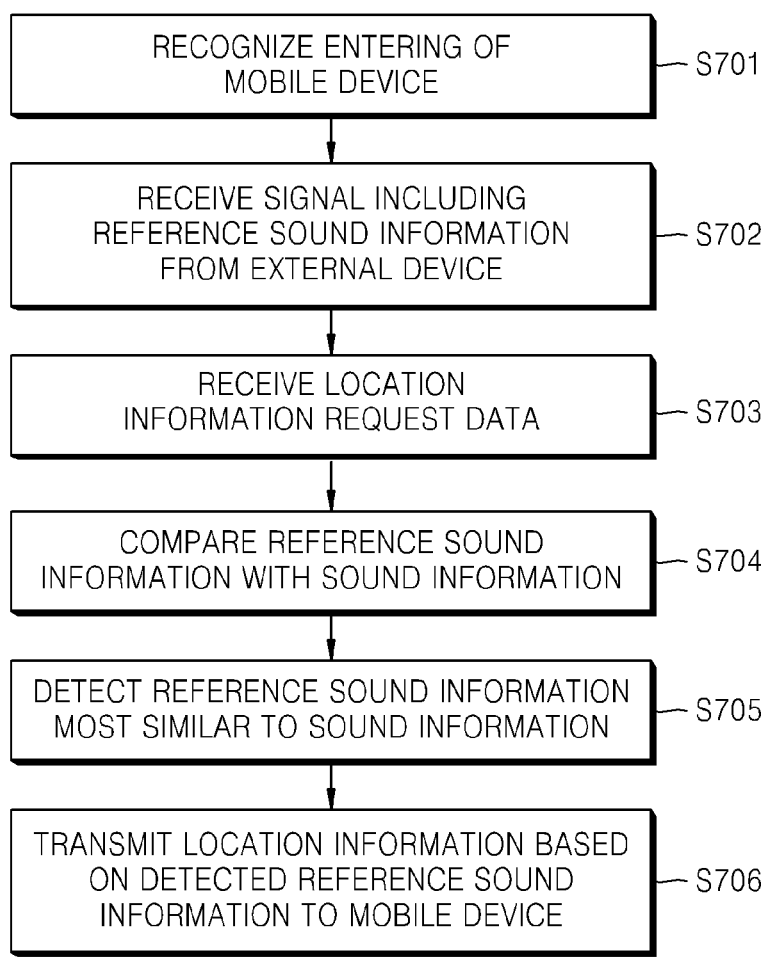
FIG. 7 is a flowchart illustrating a method of providing information, according to an embodiment of the present invention.

FIG. 7 is a flowchart illustrating a method of providing information, according to an embodiment of the present invention. Specifically, FIG. 7 corresponds to a scenario in which the information providing apparatus 130 provides information because a mobile device enters a specific area managed by the information providing apparatus 130.

In step S701, the processor 133 recognizes a mobile device physically enters a space or an area managed by the processor 133. For convenience of description, it is assumed that mobile device #1 110_1 has entered the area. The determination of whether the mobile device #1 110_1 physically enters the space or the area managed by the processor 133 may be performed based on location information received from the mobile device #1 110_1.

For example, when the space or the area managed by the processor 133 is indoors, a GPS signal of the mobile device #1 110_1 is lost when the mobile device #1 110_1 enters the space or the area, and then the processor 133 receives last position information based on the GPS signal of the mobile device #1 110_1, and a surrounding sound signal of the mobile device #1 110_1, the processor 133 may determine that the mobile device #1 110_1 physically enters the space or the area managed by the processor 133 based on the received last position information regarding the mobile device #1 110_1.

When the processor 133 determines that the mobile device #1 110_1 physically enters the space or the area managed by the processor 133 in step S701, the processor 133 receives data including reference sound information from an external device in step S702. Here, the processor 133 may receive the data including the reference sound information from at least one external device from among the external devices #1 150_1 through #N 150_N. The at least one external device is located in a predetermined area based on the most recent location information of the mobile device #1 110_1. The most recent location information of the mobile device #1 110_1 is detected by the positioning unit 111 of the mobile device #1 110_1. The predetermined area may be decided based on a cell unit or a predetermined distance described above with reference to the data stored in the storage unit 132 of FIG. 1.

In step S702, if the external device is a device located in the predetermined area (hereinafter, for convenience of description, it is assumed that the external devices #1 150_1 through #6 150_6 are located in the predetermined area), the data including the reference sound information includes reference sound information received from the external devices #1 150_1 through #6 150_6 that are located in the predetermined area based on the most recent location information provided from the positioning unit 111 of the mobile device #1 110_1.

When location information request data is received from the mobile device #1 110_1, which enters the space or the area managed by the information providing apparatus 130, the processor 133 then performs operations S704 through S706 in the same manner as operations S203 through S205 of FIG. 2.

Figure 8:
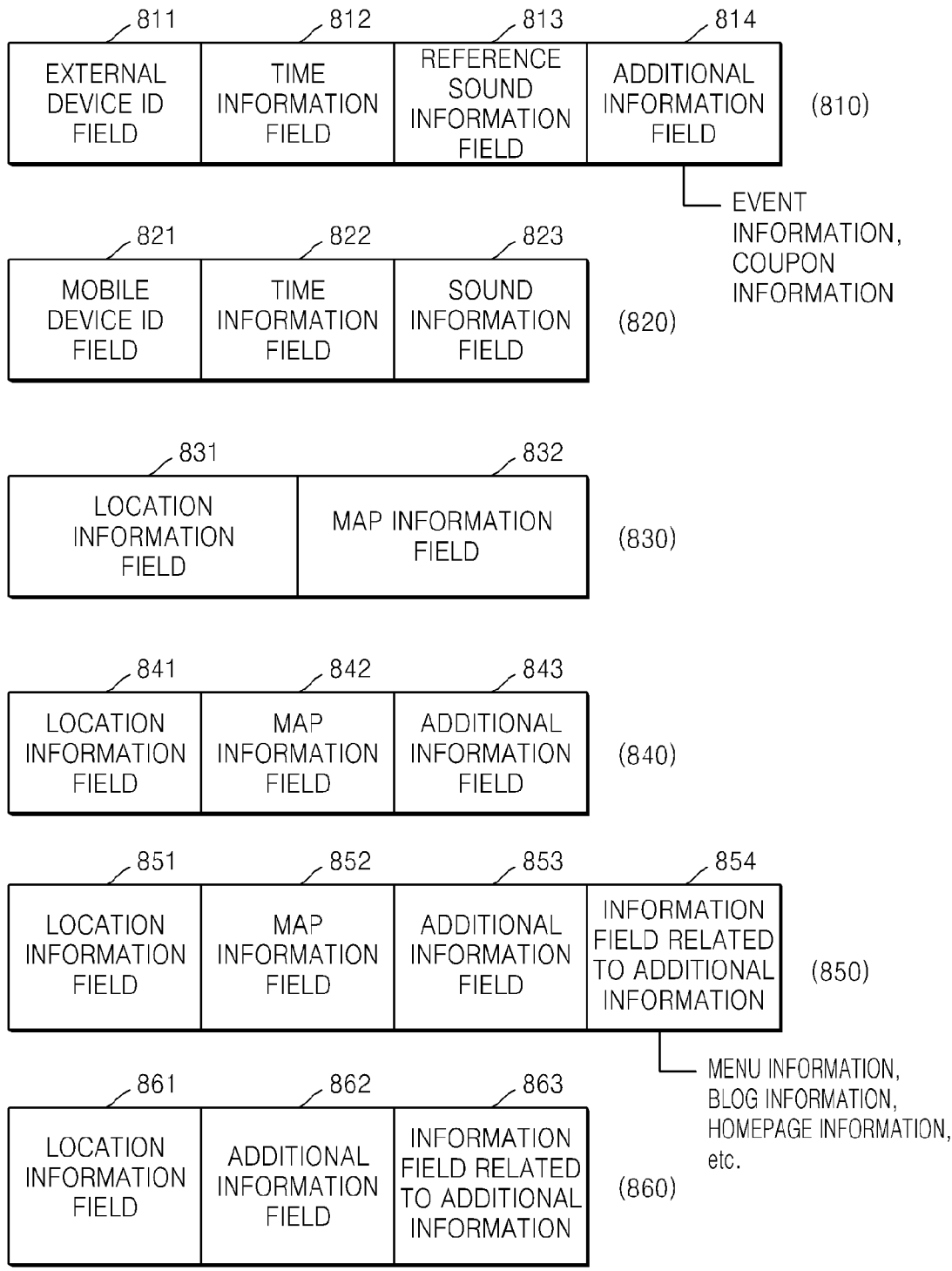
FIG. 8 illustrates an example of a data structure transmitted when information is provided, according to an embodiment of the present invention.

FIG. 8 illustrates an example of a data structure transmitted when information is provided, according to an embodiment of the present invention. In FIG. 8, reference numerals 811, 812, 813, 821, 822, and 823 are the same as reference numerals 311, 312, 313, 321, 322, and 323, which are described above. Accordingly, a repetitive description of reference numerals 811, 812, 813, 821, 822, and 823 are omitted.

Referring to FIG. 8, a structure of the data including the reference sound information received from the external devices #1 150_1 through #N 150_N, as described above with respect to FIGS. 2, 6, and 7, may further include an additional information field 814 as indicated by reference numeral 810. The additional information field 814 may include additional information related to the aforementioned location information, and information such as event information, coupon information, etc.

When the data including the reference sound information received from the external devices #1 150_1 through #N 150_N is the same as that indicated by the reference numeral 810 of FIG. 8, the information providing apparatus 130 may transmit location information including a location information field and a map information field as indicated by reference numeral 830 of FIG. 8 to the mobile devices #1 110_1 through #M 110_M, or may transmit location information further including an additional information field received from the external devices #1 150_1 through #N 150_N, as indicated by reference numeral 840 of FIG. 8, to the mobile devices #1 110_1 through #M 110_M.

The information providing apparatus 130 analyzes the additional information received from the external devices #1 150_1 through #N 150_N to generate information related to the analyzed additional information, and then transmit location information to the mobile devices #1 110_1 through #M 110_M. The location information further includes an information field related to the generated additional information as indicated by reference numeral 850 of FIG. 8. The information field related to the generated additional information may include menu information regarding the additional information, blog information related to each of the external devices #1 150_1 through #N 150_N, homepage information regarding shops in which each of the external devices #1 150_1 through #N 150_N is located, etc.

When the location information transmitted from the information providing apparatus 130 to the mobile devices #1 110_1 through #M 110_M is as indicated by reference numeral 850 of FIG. 8, location information output via the user interface unit 114 of each of the mobile devices #1 110_1 through #M 110_M may be the same as that illustrated in FIG. 9.

FIG. 9 illustrates a screen displaying location information for the mobile device #1 110_1, according to an embodiment of the present invention.

Referring to FIG. 9, reference numeral 910 of FIG. 9 indicates a current location of the mobile device #1 110_1, A, B, C, D, E, and F are shops are located at positions adjacent to the mobile device #1 110_1, the C and D shops currently provide coupons, and there is an event currently taking place at the E shop. External devices may be located at the A, B, C, D, E, and F shops, respectively, such that there are 6 external devices. However, external devices may be located between the A, B, C, D, E, and F shops, and in this case, the may be fewer external devices.

When a user of the mobile device #1 110_1 touches or selects the D shop based on location information output via the user interface unit 114 as illustrated in FIG. 9, or when the user touches or clicks a coupon 930, detail information 1 931 and detail information 2 932 of a lower layer are displayed on a region 920 so that the user may see detailed contents of the coupon 930. Correlation between the coupon 930, the detail information 1 931 and the detail information 2 932 is based on the menu information described above with reference to the processor 133.

Further, when the user touches or selects the E shop or an event 940, detail information 1 941 of a lower layer may be displayed on the region 920.

When the user touches or clicks C shop or a coupon 950 of the C shop, detail information 1 951, detail information 2 952, and detail information 3 953 of a lower layer of the coupon 950 may be displayed on the region 920.

The forms of the location information output via the user interface unit 114 are not limited to the examples of FIG. 9. For example, the region 920 on which detail information is displayed may be positioned at a lower portion of each shop or may cover an entire screen.

Figure 10:
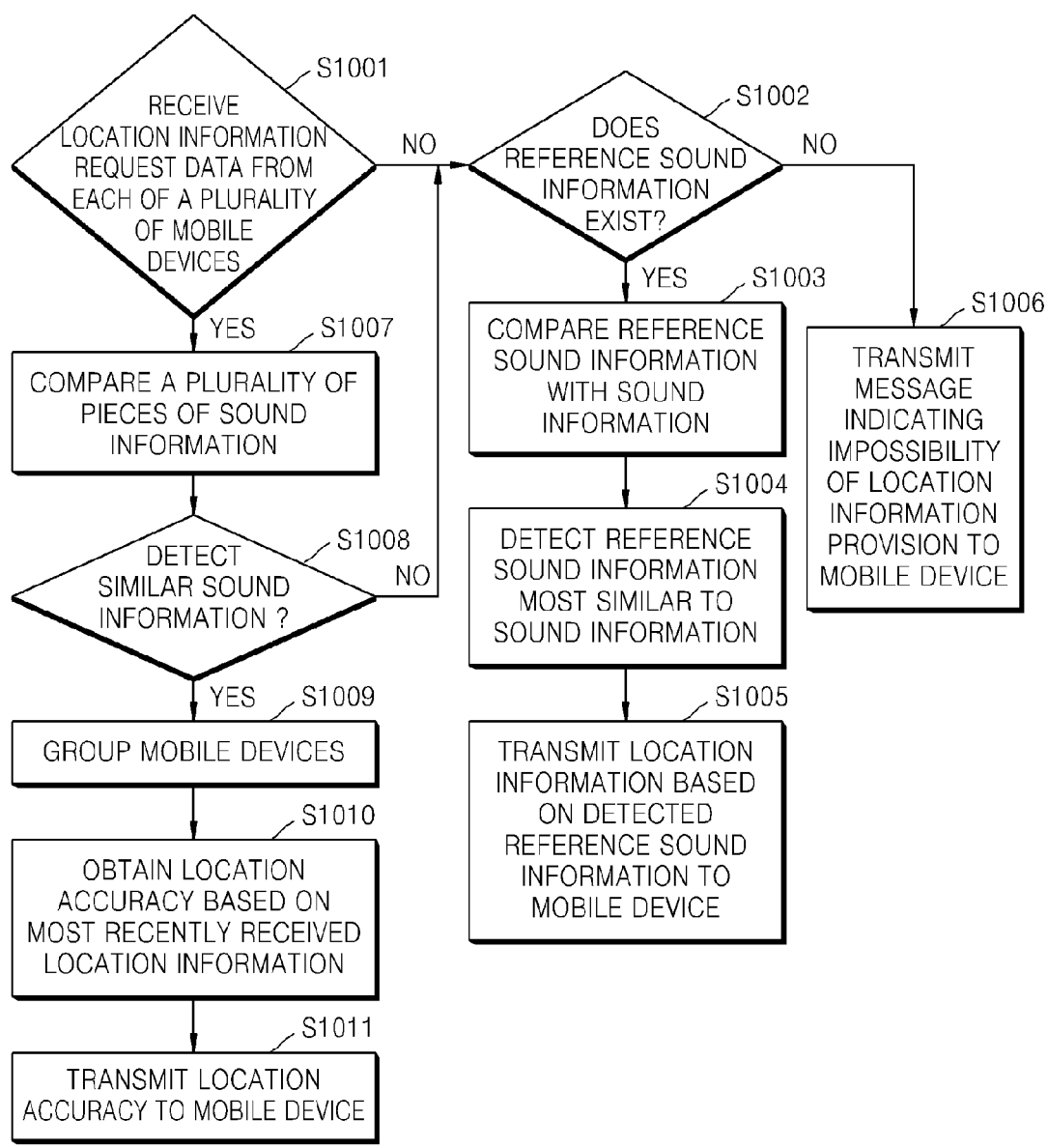
FIG. 10 is a flowchart illustrating a method of providing information, according to an embodiment of the present invention.

FIG. 10 is a flowchart illustrating a method of providing information, according to an embodiment of the present invention. Specifically, FIG. 10 illustrates a method for providing location information when it is impossible to check a location by using the external devices #1 150_1 through #N 150_N. For example, it is impossible to check the location by using the external devices #1 150_1 through #N 150_N, when the mobile devices #1 110_1 through #M 110_M are located in an area other than an area covered by the external devices #1 150_1 through #N 150_N.

Referring to FIG. 10, in step S1001, the processor 133 of the information providing apparatus 130 determines whether location information request data is received from a plurality of mobile devices. Like step S603 of FIG. 6, the processor 133 may check ID information of mobile device that is included in the location information request data to determine whether the location information request data is received from the plurality of mobile devices.

When it is determined that the location information request data is received from one mobile device in operation S1001, the processor 133 checks whether reference sound information is stored in the storage unit 132 in step S1002. The reference sound information is provided from the external devices #1 150_1 through #N 150_N, as described above with reference to FIG. 2. If the reference sound information is stored in the storage unit 132, the processor 133 performs operations S1003 through S1005, in the same manner as steps S203 through S205 of FIG. 2.

However, when it is determined that the reference sound information is not stored in operation S1002, the processor 133 will not transmit location information to the mobile device or may transmit a message indicating that it cannot provide location information the mobile device in step S1006. The message indicating that the processor 133 cannot provide the location information may include a message indicating an error.

When it is determined that a plurality of pieces of location information request data are received from the plurality of mobile devices, respectively, in step S1001, in step S1007, the processor 133 compares sound information included in the location information request data received from each of the mobile devices, as described above.

If no sound information is detected at the same time or if of the detected sound information is not similar, the processor 133 performs operations S1002 through S1006 on the plurality of pieces of sound information received from the plurality of mobile devices, respectively.

However, if there is similar sound information, the processor 133 groups mobile devices that have transmitted location information request data including a similar sound information in step operation S1009. For convenience of description, it is assumed that the mobile device #1 110_1 and the mobile device #2 110_2 have transmitted location information request data including similar sound information, such that the processor 133 groups the mobile device #1 110_1 and the mobile device #2 110_2.

The processor 133 detects the most recently received location information from among a plurality of pieces of location information received from the mobile device #1 110_1 and the mobile device #2 110_2 that are grouped, and then obtains location accuracy in step S1010. The location information of each of the mobile device #1 110_1 and the mobile device #2 110_2 is obtained by each of the positioning units 111 of the mobile device #1 110_1 and the mobile device #2 110_2, and may be received when the mobile device #1 110_1 and the mobile device #2 110_2 enter a specific area. The location accuracy based on the most recently received location information may be obtained by using a movement distance that is predicted according to a difference between a time at which the most recently received location information is received and a current time.

When the location accuracy is obtained, the processor 133 transmits the obtained location accuracy to each of the mobile device #1 110_1 and the mobile device #2 110_2 in step S1011.

FIGS. 11 through 15 illustrate different scenarios regarding methods of providing information, according to embodiments of the present invention.

Figure 11:
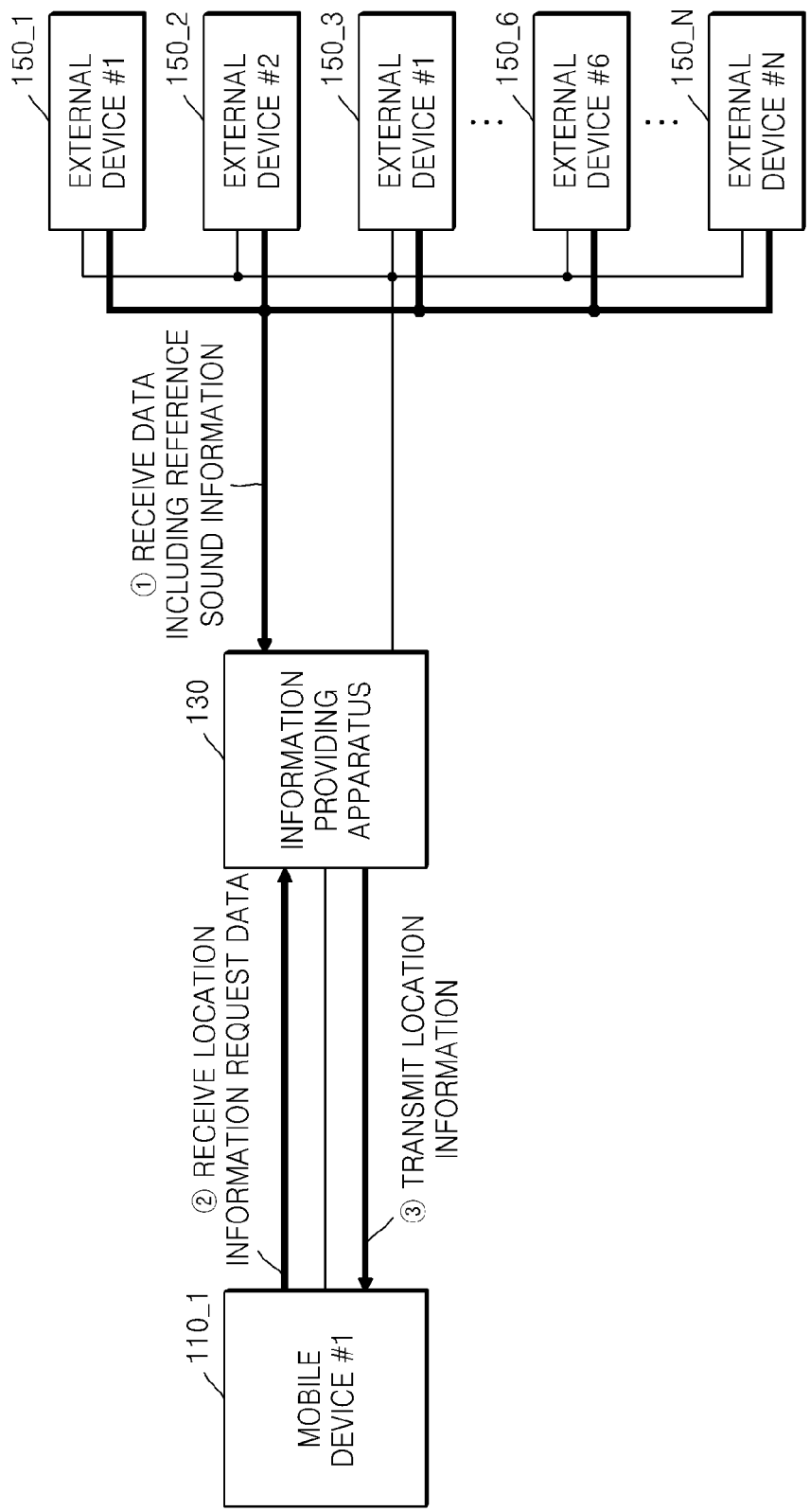
FIGS. 11 through 15 illustrate methods of providing information, according to embodiments of the present invention.

FIG. 11 is an example based on the flowchart of FIG. 2, in which reference sound information is received from each of the external devices #1 150_1 through #N 150_N, which can be connected to the information providing apparatus 130 ($\hat{1}$). When location information request data including sound information is received from the mobile device #1 110_1 ($\hat{2}$), reference sound information corresponding to the sound information included in the received location information request data is detected. When receiving the detected reference sound information from the external device #1 150_1, location information based on location information of the external devices #1 150_1, which provides the detected reference sound information, is transmitted to the mobile device #1 110_1 ($\hat{3}$).

Figure 12:
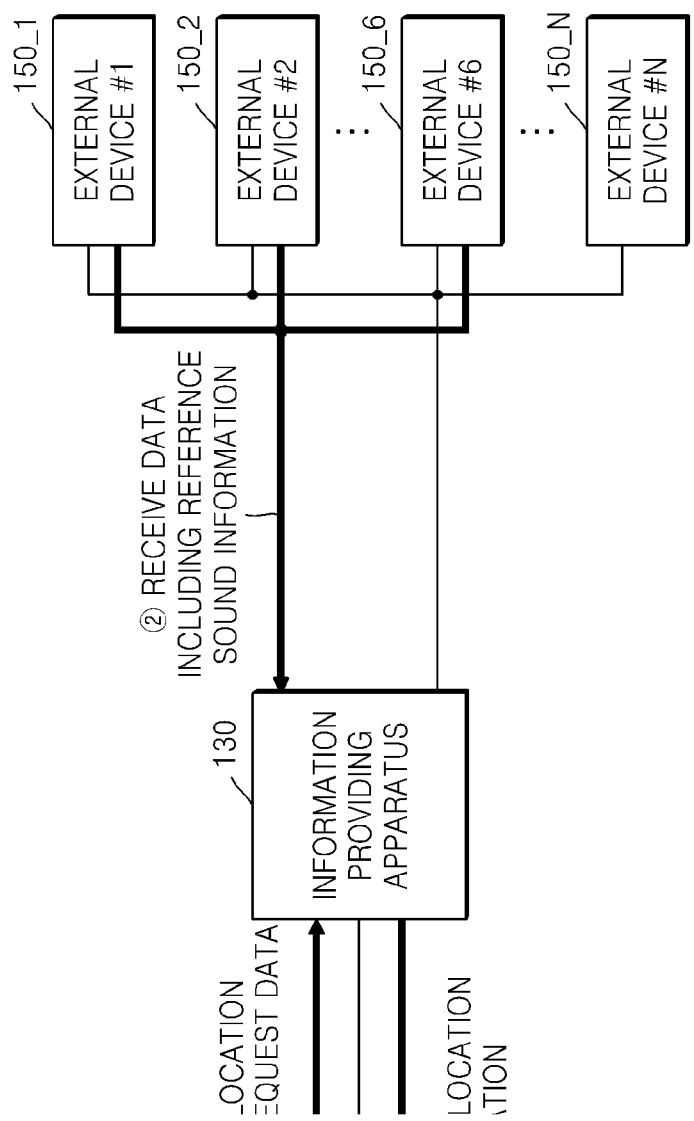

FIG. 12 is an example in which, when location information request data is received from the mobile device #1 110_1, reference sound information is received from the external devices #1 150_1 through #6 150_6, which are located in a predetermined area based on the most recent location of the mobile device #1 110_1, and then location information is provided to the mobile device #1 110_1. The external devices #1 150_1 through #6 150_6 can be connected to the information providing apparatus 130. In this example, the information providing apparatus 130 does not receive data including reference sound information from the external devices #7 150_7 through #N 150_N that can be connected to the information providing apparatus 130, but are not located in the predetermined area.

That is, when the location information request data including sound information is received from the mobile device #1 110_1 ($\hat{1}$), the information providing apparatus 130 receives the data including the reference sound information from the external devices #1 150_1 through #6 150_6 that are located in a predetermined area determined according to a location of the mobile device #1 110_1 and that are from among the external devices #1 150_1 through #N 150_N that can be connected to the information providing apparatus 130 ($\hat{2}$). The information providing apparatus 130 transmits location information to the mobile device #1 110_1 based on the received data ($\hat{3}$).

Figure 13:
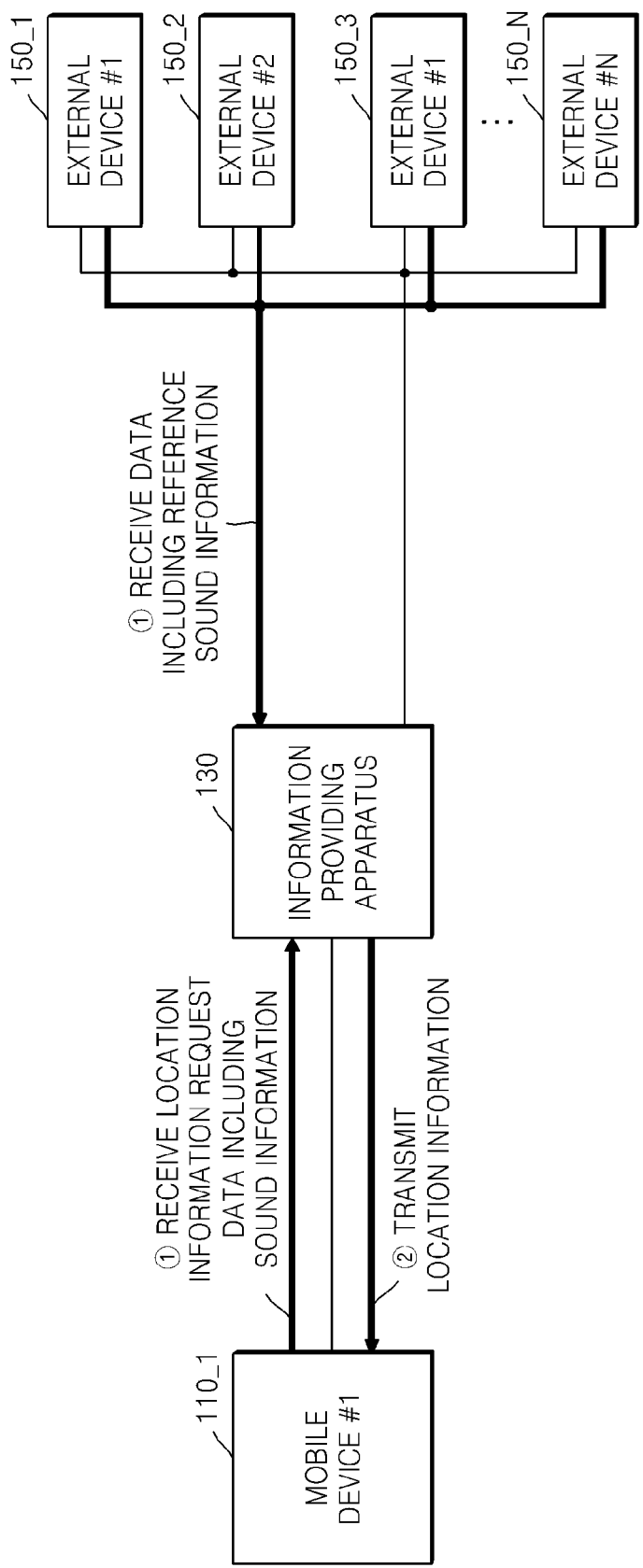

FIG. 13 is an example in which the information providing apparatus 130 simultaneously receives location information request data from the mobile device #1 110_1, and data including reference sound information from each of external devices #1 150_1 through #N 150_N that can be connected to the information providing apparatus 130 ($\hat{1}$). The information providing apparatus 130 then transmits location information to the mobile device #1 110_1 ($\hat{2}$).

Figure 14:
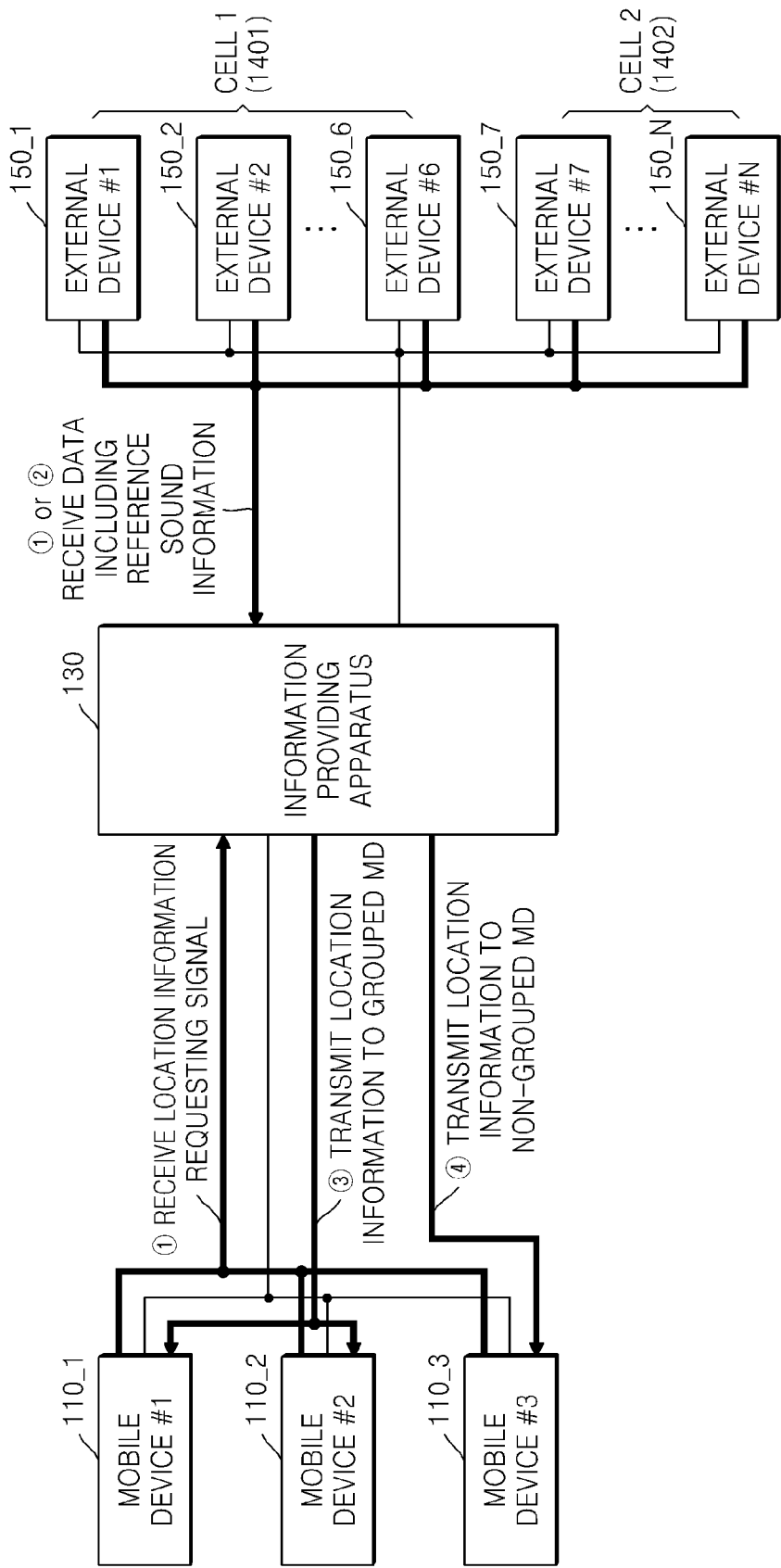

FIG. 14 is an example in which the information providing apparatus 130 transmits location information when sound information included in location information request data transmitted from each of a plurality of mobile devices (e.g., the mobile device #1 110_1 and the mobile device #2 110_2) are the same or at least similar to each other, and the mobile device #3 110_3 transmits location information request data including sound information that is different from sound information of each of the mobile devices #1 110_1 and #2 110_2.

In the example of FIG. 14, when location information request data including the sound information are received from each of the mobile devices #1 110_1 through #3 110_3, the information providing apparatus 130 may receive data including reference sound information from each of the external devices #1 150_1 through #N 150_N ($\hat{1}$). However, after the location information request data including the sound information is received from each of the mobile devices #1 110_1 through #3 110_3 ($\hat{1}$), the information providing apparatus 130 may receive the data including the reference sound information from each of the external devices #1 150_1 through #N 150_N ($\hat{2}$).

Therefore, when a predetermined area that is determined based on location information by the positioning units 111 of the mobile devices #1 110_1 and #2 110_2 corresponds to a cell 1 1401, when the information providing apparatus 130 receives data including reference sound information to provide location information of the mobile devices #1 110_1 and #2 110_2 to the mobile devices #1 110_1 and #2 110_2, the information providing apparatus 130 may receive data including reference sound information from each of the external devices #1 150_1 through #6 150_6 that are included in the cell 1 1401.

Further, when a predetermined area that is determined based on location information by the positioning unit 111 of the mobile device #3 110_3 corresponds to a cell 2 1402, when the information providing apparatus 130 receives data including reference sound information so as to provide location information of the mobile device #3 110_3 to the mobile device #3 110_3, the information providing apparatus 130 may receive data including reference sound information from each of the external devices #7 150_7 through #N 150_N that are included in the cell 2 1402.

Because the mobile devices #1 110_1 and #2 110_2 are grouped due to transmission of the location information request data including the sound information that are equal or similar to each other, the information providing apparatus 130 transmits the same location information to each of the mobile devices #1 110_1 and #2 110_2 ($\hat{3}$). Also, the information providing apparatus 130 transmits location information to the mobile device #3 110_3 that is not grouped ($\hat{4}$).

In FIG. 14, MD indicates a mobile device. Alternatively, as in the flowchart of FIG. 10, FIG. 14 may be changed to provide location information based on location information received from grouped mobile devices from among the mobile devices #1 110_1 through #M 110_M, without using reference sound information received from the external devices #1 150_1 through #N 150_N.

Figure 15:
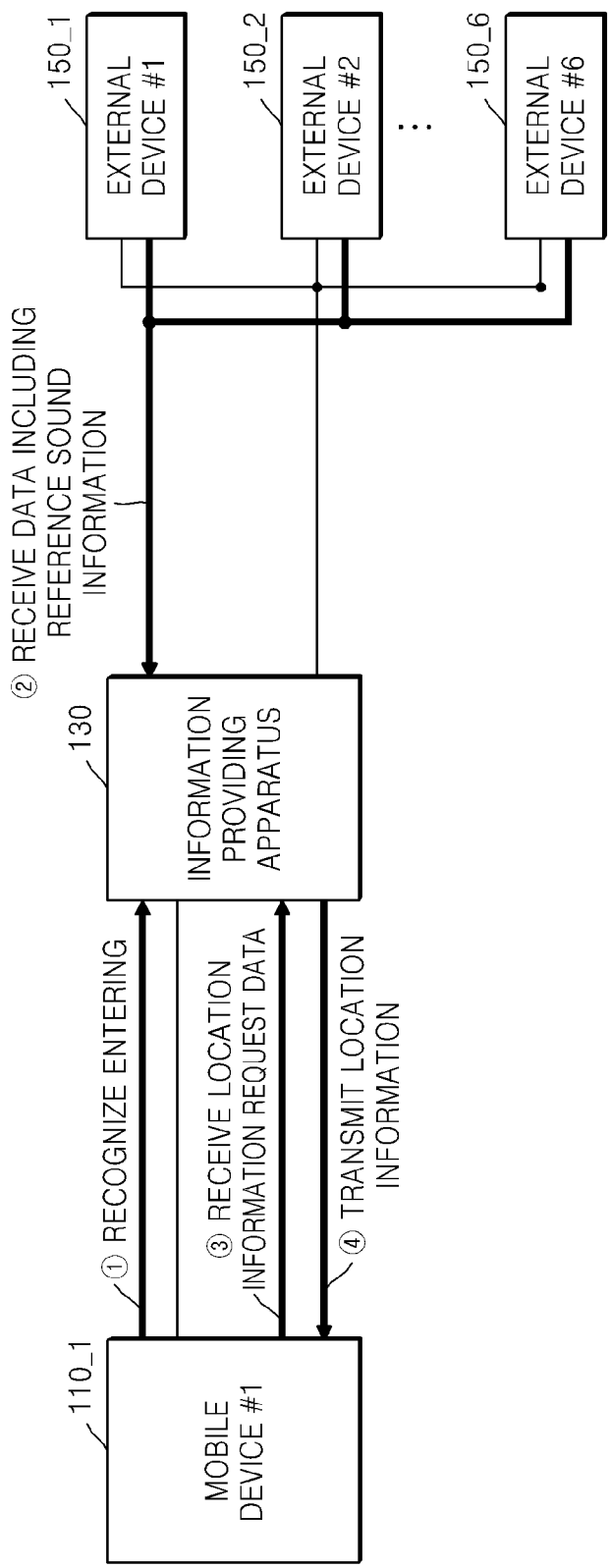

FIG. 15 is an example based on the flowchart of FIG. 7, in which, when the information providing apparatus 130 detects that the mobile device #1 110_1 enters an area managed by the information providing apparatus 130 (①), the information providing apparatus 130 receives data including reference sound information from each of the external devices #1 150_1 through #6 150_6 that are located in a predetermined area based on a current location of the mobile device #1 110_1 (②). When location information request data is received from the mobile device #1 110_1 (③), the information providing apparatus 130 transmits location information to the mobile device #1 110_1 (④).

The aforementioned examples are based on sound information. However, the aforementioned examples may be embodied based on surrounding situation information, instead of the sound information. The surrounding situation information may be obtained using multiple sensors that are capable of sensing a surrounding situation such as temperature, humidity, lighting, or air around a device, or by using visual indicators, such as photo or video clip information obtained by using a camera function.

Figure 16:
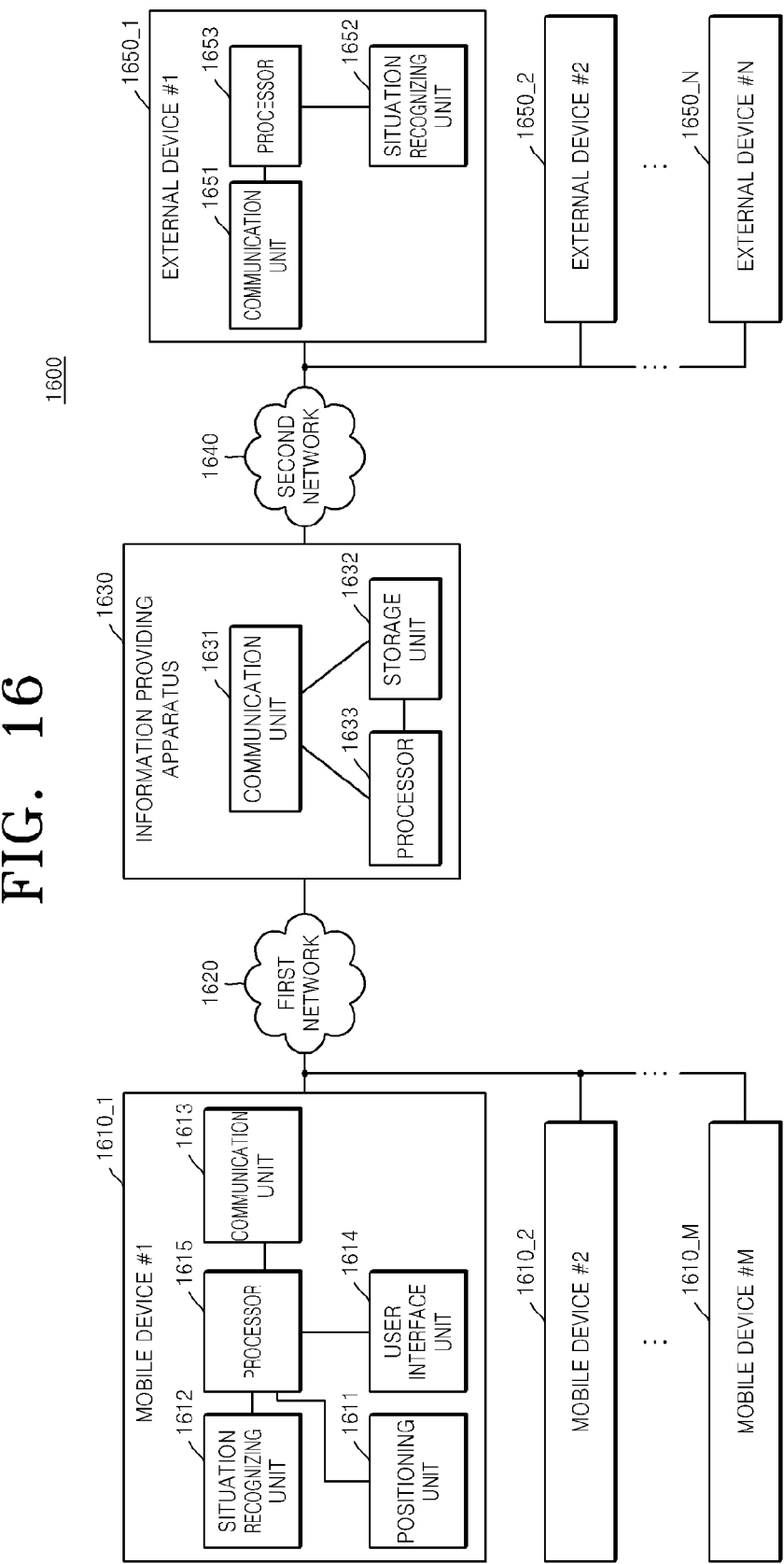
FIG. 16 is a block diagram illustrating a service providing system including an information providing apparatus according to an embodiment of the present invention.

For example, when the surrounding situation information is used, instead of the sound information, the service providing system 100 of FIG. 1 may be modified to a service providing system 1600 as illustrated in FIG. 16.

Referring to FIG. 16, a mobile device #1 1610_1 included in the service providing system 1600 includes a situation recognizing unit 1612, instead of the sound receiving unit 112 included in the mobile device #1 110_1 of FIG. 1, and an external device #1 1650_1 included in the service providing system 1600 includes a situation recognizing unit 1652, instead of the sound receiving unit 152 included in the external device #1 150_1 of FIG. 1.

As described above, the situation recognizing units 1612 and 1652 may be formed to recognize a surrounding situation around a device or an apparatus by using one or more of the multiple sensors. The service providing system 1600 of FIG. 16 is operated in the same manner as the service providing system 100 of FIG. 1, except that the service providing system 1600 uses situation recognition information recognized by the situation recognizing units 1612 and 1652.

Figure 17:
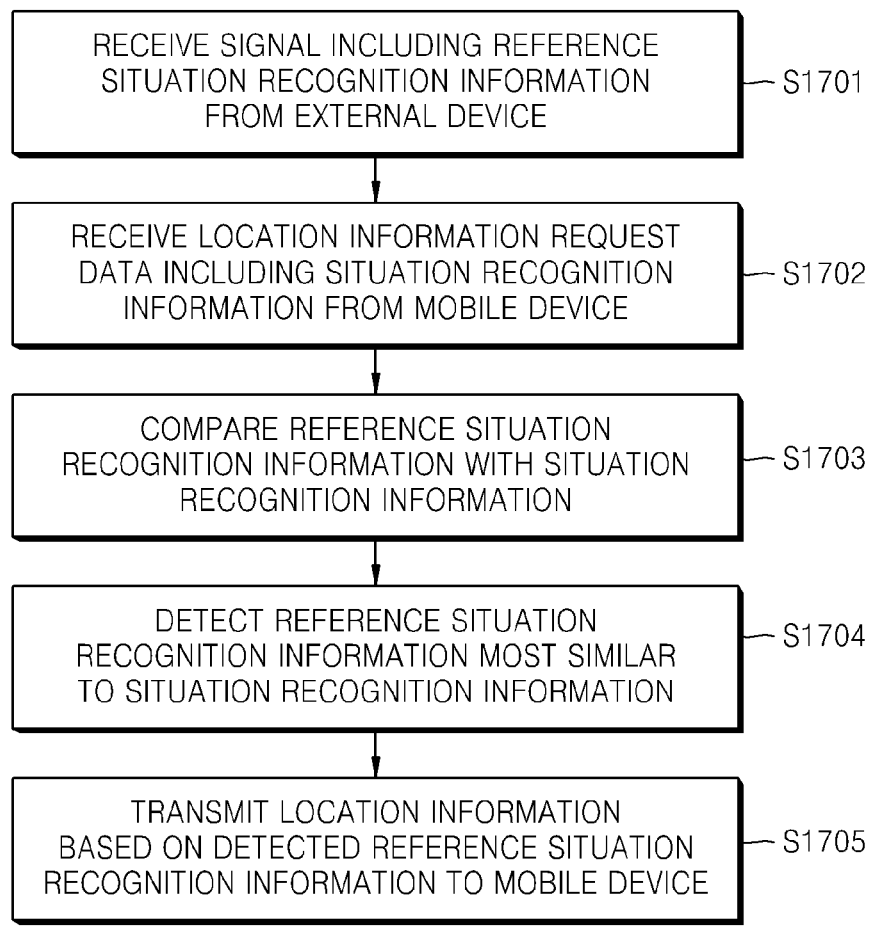
FIG. 17 is a flowchart illustrating a method of providing information, according to an embodiment of the present invention.

FIG. 17 is a flowchart illustrating a method of providing information, based on situation recognition information, according to an embodiment of the present invention.

Referring to FIG. 17, when a signal including reference situation recognition information is received from external devices #1 1650_1 through #N 1650_N in step S1701, and location information request data including situation recognition information is received from at least one mobile device from among mobile devices #1 1610_1 through #M 1610_M in step S1702, the processor 1633 compares the reference situation recognition information with the situation recognition information received from at least one mobile device from among mobile devices #1 1610_1 through #M 1610_M in step S1703. The processor 1633 detects reference situation recognition information that is most similar to the received situation recognition information in step S1704), and transmits location information based on the detected reference situation recognition information to a mobile device that has requested the location information in step S1705.

Accordingly, it will be understood that the embodiments illustrated in FIGS. 3 through 15 may be modified to use situation recognition information, instead of using sound information, according to the embodiments illustrated in FIGS. 16 and 17.

The invention may also be embodied as computer readable codes on a non-transitory computer readable recording medium. The computer readable recording medium is any data storage device that can store data that can be thereafter read by a computer system. Examples of the computer readable recording medium include a Read-Only Memory (ROM), a Random-Access Memory (RAM), Compact Disc (CD)-ROMs, magnetic tapes, floppy disks, optical data storage devices, etc. The computer readable recording medium may also be distributed over network coupled computer systems so that the computer readable code is stored and executed in a distributed fashion.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of providing location information to a mobile device by an apparatus, the method comprising:
   receiving, by a processor of the apparatus, location information including sound information from a plurality of mobile devices;
   comparing, by the processor, the sound information received from the plurality of mobile devices;
   grouping, by the processor, mobile devices that have transmitted similar sound information, according to a result of comparing the sound information;
   detecting, by the processor, most recently received location information from among a plurality of piece of location information received from the grouped mobile devices;
   detecting, by the processor, a difference between a time when the detected most recently received location information is received and a current time; p1 obtaining, by the processor, the location information by using a movement distance that is predicted according to the detected difference; and
   transmitting, by the processor, the obtained location information to each of the grouped mobile devices.

2. The method of claim 1, further comprising: determining, by the processor, whether the mobile device enters an area managed by the apparatus.

3. The method of claim 2, wherein the area is based on most-recent location information of the mobile device.

4. The method of claim 1, wherein the location information includes map information indicating a current location of the mobile device.

5. The method of claim 4, wherein the location information further includes additional information related to the current location, wherein the additional information includes at least one of event information and coupon information.

6. The method of claim 1, wherein the sound information includes sound surrounding the plurality of mobile devices.

7. The method of claim 1, further comprising:
   receiving, by the processor, sound information from at least one other device connected to the apparatus;
   receiving, by the processor, location information request data including sound information from the mobile device;
   comparing, by the processor, the sound information received from the at least one other device and sound information received from the mobile device;
   detecting, by the processor, similar sound information to the sound information received from the mobile device according to a result of comparing the sound information, wherein the detected similar sound information is received from the at least one other device;

determining, by the apparatus, location information of a device that transmitted the similar sound information, from among the at least one other device; and transmitting, by the processor, the obtained location information of the device to the mobile device.

8. The method of claim 7, further comprising:
receiving additional information from the at least one other device; and
transmitting the additional information of the other device to the mobile device when transmitting the obtained location information of the device to the mobile device, wherein the additional information includes at least one of event information and coupon information.

9. The method of claim 8, wherein transmitting the additional information of the device to the mobile device includes at least one of menu information related to the additional information and information related to the additional information.

10. The method of claim 7, wherein comparing the sound information received from the at least one other device and the sound information received from the mobile device is performed based on time information indicating a time at which the sound information is received.

11. The method of claim 7, wherein the sound information received from the at least one other device includes sound surrounding the at least one other device.

12. An apparatus for providing location information to a mobile device, the apparatus comprising:
a communication unit for receiving location information including sound information from a plurality of mobile devices; and
a processor for receiving the location information including sound information from a plurality of mobile devices via the communication unit, comparing the sound information received from the plurality of mobile devices, grouping mobile devices that have transmitted similar sound information, according to a result of comparing the sound information, detecting most recently received location information from among a plurality of piece of location information received from the grouped mobile devices, detecting a difference between a time when the detected most recently received location information is received and a current time, and obtaining location information by using a movement distance that is predicted according to the detected difference, and transmitting the obtained location information to each of the grouped mobile devices via the communication unit.

13. The apparatus of claim 12, wherein the processor determines whether the mobile device enters an area managed by the apparatus.

14. The apparatus of claim 13, wherein the area is based on most-recent location information of the mobile device.

15. The apparatus of claim 12, wherein the location information includes map information indicating a current location of the mobile device.

16. The apparatus of claim 15, wherein the location information further includes additional information related to the current location.

17. The apparatus of claim 12, wherein the sound information includes sound surrounding the plurality of mobile devices.

18. The apparatus of claim 12, wherein the processor:
receives sound information from at least one other device connected to the apparatus;
receives location information request data including sound information from the mobile device;
compares the sound information received from the at least one other device and sound information received from the mobile device;
detects similar sound information to the sound information received from the mobile device according to a result of comparing the sound information, wherein the detected similar sound information is received from the at least one other device;
determines location information of a device that transmitted the similar sound information, from among the at least one other device; and
transmits the obtained location information of the device to the mobile device.

19. A non-transitory computer readable recording medium having recorded thereon at least one program which includes commands for executing a method of providing location information to a mobile device by an apparatus, the method comprising:
receiving, by a processor of the apparatus, location information including sound information from a plurality of mobile devices;
comparing, by the processor, the sound information received from the plurality of mobile devices;
grouping, by the processor, mobile devices that have transmitted similar sound information, according to a result of comparing the sound information;
detecting, by the processor, most recently received location information from among a plurality of piece of location information received from the grouped mobile devices;
detecting, by the processor, a difference between a time when the detected most recently received location information is received and a current time;
obtaining, by the processor, the location information by using a movement distance that is predicted according to the detected difference; and
transmitting, by the processor, the obtained location information to each of the grouped mobile devices.

* * * * *